United States Patent
Kühner

(10) Patent No.: US 8,507,595 B2
(45) Date of Patent: Aug. 13, 2013

(54) PLASTICIZER COMPOSITION

(75) Inventor: Uwe Dietrich Kühner, Hamburg (DE)

(73) Assignee: Nanoresins AG, Geesthacht (DE)

( * ) Notice: Subject to any disclaimer, the term of this patent is extended or adjusted under 35 U.S.C. 154(b) by 0 days.

(21) Appl. No.: 12/671,195

(22) PCT Filed: May 29, 2008

(86) PCT No.: PCT/EP2008/004288
§ 371 (c)(1),
(2), (4) Date: Jun. 30, 2010

(87) PCT Pub. No.: WO2009/015715
PCT Pub. Date: Feb. 5, 2009

(65) Prior Publication Data
US 2010/0280168 A1      Nov. 4, 2010

(30) Foreign Application Priority Data
Jul. 30, 2007   (EP) ..................... 07014928

(51) Int. Cl.
*C08K 5/00*      (2006.01)
*C08L 43/00*     (2006.01)
(52) U.S. Cl.
USPC ......................................... 524/284; 524/547
(58) Field of Classification Search
USPC ...................................................... 524/284
See application file for complete search history.

(56) References Cited

U.S. PATENT DOCUMENTS

| 2,801,185 | A |   | 7/1957 | Iler et al. |
| 3,938,574 | A | * | 2/1976 | Burmester et al. ......... 152/209.1 |
| 2003/0221778 | A1 |   | 12/2003 | Musch et al. |
| 2004/0147029 | A1 | * | 7/2004 | Adam ............................. 436/8 |

FOREIGN PATENT DOCUMENTS

| DE | 10018637 | 10/2000 |
| EP | 0306862 | 3/1989 |
| EP | 1236765 | 9/2002 |
| EP | 1366112 | 12/2003 |
| GB | 1487100 | 9/1977 |
| JP | 50-088150 | 7/1975 |

OTHER PUBLICATIONS

Cadogan et al., "Plasticizers," Ullmann's Encyclopedia of Industrial Chemistry, 6th Edition, 27, pp. 217-236.
GB 1487100 is the English equivalent of JP 50-088150.

* cited by examiner

*Primary Examiner* — Hui Chin
(74) *Attorney, Agent, or Firm* — Casimir Jones, S.C.

(57) ABSTRACT

The invention relates to a composition containing at least one plasticizer and silicon dioxide particles having an average particle size of 150 nm or less. According to the invention, the proportion of silicon dioxide particles is from 10 to 80% by weight and the proportion of plasticizer is from 90 to 20% by weight, where the sum of the proportions of silicon dioxide particles and of the plasticizer is at least 80% by weight. The invention makes it possible to mix nanoparticles into any polymeric materials in a simple way.

31 Claims, No Drawings

PLASTICIZER COMPOSITION

This application is a §371 US National Entry of International Application No. PCT/EP2008/004288, filed May 29, 2008, which claims the benefit of European Application No. 07014928.1, filed Jul. 30, 2007, each of which is incorporated herein by reference in its entirety.

The invention relates to a plasticizer composition. It is known that polymeric materials such as polyurethanes, polyureas or reactive resins can be provided with fillers in order to modify particular properties of the polymeric material. For example, impact toughness, flexural strength, hardness or electrical insulation capability can be improved in this way.

It is likewise known that plasticizers can be added to polymeric materials, for example to modify their mechanical properties or to reduce production costs by addition of generally inexpensive plasticizers.

It is an object of the invention to provide a simple way of introducing fillers into various polymeric materials.

The invention provides a composition containing at least one plasticizer and silicon dioxide particles having an average particle size of 150 nm or less, characterized in that the proportion of silicon dioxide particles is from 10 to 80% by weight and the proportion of plasticizer is from 90 to 20% by weight, where the sum of the proportions of silicon dioxide particles and of the plasticizer is at least 80% by weight.

Some terms used in the context of the invention will firstly be explained.

The composition of the invention contains plasticizers. Plasticizers are inert, organic substances which have a low vapour pressure and react purely physically with polymers to form a homogeneous phase. Plasticizers in a polymeric material increase, for example, its flexibility or improve the processability.

The term plasticizer is defined in Ullmann's Encyclopedia of Industrial Chemistry, $6^{th}$ edition, volume 27, page 217 ff. This definition and the description of suitable plasticizers is expressly incorporated by reference into the present patent application. A plasticizer preferably has a vapour pressure at 20° C. of less than 0.1 hPa. Further preferred upper limits are 0.01 and 0.001 hPa.

The composition additionally contains silicon dioxide particles having an average particle size of 150 nm or less. These are known as nanoparticles. Such nanoparticles can be produced, for example, by precipitating $SiO_2$ from aqueous alkali metal silicate solutions (known as silica sols). Suitable methods of production are described, for example, in EP-A-1 366 112, the disclosure of which is likewise incorporated by reference into the present application.

The particle size was determined at a solids content of 10% in toluene dispersion by dynamic light scattering on a Dynamic Light Scattering Particle Size Analyzer LB-550 from Horiba. The D50 of the particle size distribution is reported as particle size. A measure of the width of the distribution is the span. It is dimensionless and given by (D90–D10)/D50.

The composition of the invention comprises predominantly plasticizers and silicon dioxide particles. It is thus preferably an intermediate which can be further processed together with further materials, e.g. preferably polymerizable materials, to give an end product.

The invention has recognized that a silicon dioxide nanoparticle can be readily incorporated into plasticizers to form stable dispersions therein. In addition, nanoparticles can also be incorporated by means of a composition according to the invention into polymeric materials into which nanoparticles can be incorporated directly only with difficulty, if at all. Examples which may be mentioned are plasticized PVC, natural rubber or the like.

According to the invention, it is possible to incorporate nanoparticles of other metal oxides instead of silicon dioxide nanoparticles into plasticizers so as to produce a composition according to the invention. Examples which may be mentioned are metal oxides of the third and fourth main groups of the Periodic Table, transition metal oxides and also oxides of the lanthanides and actinides. Greater preference is given to $Al_2O_3$, $TiO_2$ and $ZnO_2$.

In a preferred embodiment of the invention, the sum of the proportions of silicon dioxide particles and the plasticizers in the composition of the invention is at least 85% by weight; more preferred minimum proportions are 90% by weight, 95% by weight, 97% by weight, 98% by weight, 99% by weight, 99.5% by weight, 99.8% by weight and 99.9% by weight.

The proportion of silicon dioxide particles, based on the total mass of the composition of the invention, is preferably from 20 to 70% by weight, more preferably from to 60% by weight, more preferably from 40 to 60% by weight. A further preferred range is from 50 to 75% by weight. The composition of the invention can thus contain a high proportion of nanoparticles without its processability being adversely affected.

The proportion of plasticizers, based on the total mass of the composition, is preferably from 30 to 80% by weight, more preferably from 40 to 70% by weight, more preferably from 40 to 60% by weight.

In a further preferred variant, the composition of the invention is solvent-free. This means that solvents (aqueous or organic solvents) are not present or in any case not present to an industrially relevant extent in the composition. Preferred maximum limits are 1% by weight, 0.5% by weight and 0.1% by weight. For the purposes of the invention, the term solvent refers to any material which has a vapour pressure at 20° C. of more than 0.1 hPa, preferably more than 1 hPa. The solvent content can be determined as percentage loss in mass on a Sartorius moisture determination balance using a weight of 5 g, 130° C. and a run time of 15 minutes.

The composition of the invention preferably consists exclusively of plasticizers and silicon dioxide particles. In a further preferred embodiment of the invention, the composition is free of further polymerizable monomers, oligomers or prepolymers.

The silicon dioxide particles preferably have an average particle size of from 4 to 80 nm, more preferably from 8 to 40 nm, even more preferably from 10 to 30 nm, even more preferably from 10 to 25 nm.

The silicon dioxide particles are preferably colloidally dispersed in the composition. Colloidal means that they are essentially present individually in the dispersion and no industrially relevant formation of aggregates or agglomerates has occurred. Such formation of aggregates or agglomerates of the silicon dioxide particles could lead to an undesirable increase in the viscosity and thus greater difficulty in processing the composition of the invention or intermediates or end products produced therefrom.

The plasticizers in the composition of the invention are preferably selected from the group consisting of phthalates, adipates, trimellitic esters, phosphate esters, sebacates, azelates and sulphonates.

Further suitable plasticizers are, for example, benzenedicarboxylic esters, citraconic esters, 2-hydroxy-1,2,3-propanetricarboxylic esters, malonic esters, succinates, vegetable and animal oils, benzoic esters, triethylene glycol dihexanoate, tetraethylene glycol diheptanoate, linear alkylbenzenes (LABs), branched alkylbenzenes (BABs), polyethylene glycols, polyethylene glycol ethers, polypropylene glycols and polypropylene glycol ethers.

The silicon dioxide particles preferably have a surface modification which makes them compatible with the plasticizer. Such a surface modification preferably serves to hydrophobicize the surface of the silicon dioxide particles which is hydrophilic per se and thus improve the compatibility with the hydrophobic matrix of the plasticizer. Known methods which are well known in the art for compatibilizing the surface are, for example, silanization of the surface, alcoholysis of the surface and purely physical attachment of hydrophobic polymers.

Silanization of the surface of the $SiO_2$ particles is preferably effected using organosilanes or organo-siloxanes. This silanization is a technology which is well known in the art.

The organosilanes or organosiloxanes are preferably selected from the group consisting of organosilanes of the formula $R^1_a H_b SiX_{4-a-b}$ and organosiloxanes of the formula $R^1_n SiO_{(4-n)/2}$, where each $R^1$ is selected independently from among hydrocarbon radicals having from 1 to 18 carbon atoms and organofunctional hydrocarbon radicals having from 1 to 18 carbon atoms, each X is selected independently from among halogen atoms and alkoxy radicals having from 1 to 18 carbon atoms, a=0, 1, 2 or 3, b=0 or 1, a+b=1, 2 or 3, with the proviso that when b=1, then a+b=2 or 3 and n is an integer from 2 to 3 inclusive.

Particular preference is given to using an halosilane, more preferably a chlorosilane. The silanes can be functionalized, for example with polymerizable groups, in particular vinyl groups. According to the invention, it is possible to carry out two silanization steps using different silanes. For example, a functionalized silane, preferably a vinylsilane, can be used in only one of the two silanization steps. It is likewise possible to use mixtures of functionalized and unfunctionalized silanes in a silanization step.

To carry out the surface modification, the $SiO_2$ particles can be treated with monohydric alcohols, polyols or mixtures thereof. Saturated primary alcohols are preferred. As a result of the treatment, silanol groups on the surface of the $SiO_2$ particles bond chemically to the hydroxy groups of the alcohol, so that ester groups bound to the surface are formed. This technique is described, for example, in U.S. Pat. No. 2,801,185.

Surface modification by means of polymers which adhere primarily physically, e.g. polyorganosiloxanes, is disclosed, for example, in EP 0 306 862 B1.

The invention further provides for the use of a composition according to the invention for introducing silicon dioxide particles into a polymeric material. The composition of the invention provides a storage-stable, simple option for introducing nanoparticles into any type of polymerizable materials. The use according to the invention in polymerizable materials of this kind into which nanoparticles can be incorporated in a conventional way only with difficulty is particularly advantageous. Mention may be made by way of example of thermoplastic materials or PVC materials, in particular plasticized PVC; natural rubber, butyl rubber, acrylate rubber, styrene-butadiene rubbers (SBRs), hydrogenated or unhydrogenated nitrile-butadiene rubbers, etc.

The proportion of silicon dioxide particles introduced by means of the use according to the invention, based on the total mass (sum of the mass of the polymerizable material and the composition according to the invention of plasticizer and silicon dioxide particles), is preferably from 1 to 50% by weight, preferably from 1 to 30% by weight, more preferably from 1 to 20% by weight, more preferably from 1 to 10% by weight, more preferably from 2 to 6% by weight.

Examples of the invention are described below.

EXAMPLE 1

Production of a Silicon Dioxide Dispersion in Isopropanol

A commercial aqueous alkali metal silicate solution having a water content of 47% and a ratio of $SiO_2$ to $Na_2O$ of 2.4 was diluted with demineralized water to a water content of 97%. 100 parts of this diluted solution were passed at a rate of 20 parts per hour through a column filled with a commercial acidic ion exchanger and then fed to a distillation reservoir in which the inflowing deionized silicate solution was kept at boiling point and the water was distilled off from the solution. After the introduction of solution had ended, the silica sol formed was reduced to 10 parts by further heating. The pH was set to 10.5-11. 100 parts of this sol were mixed with 2000 parts of isopropanol and the water was removed by atmospheric distillation to a content determined by the Karl-Fischer method of less than 0.1%.

EXAMPLE 2

Production of a Silicon Dioxide Dispersion in Toluene 63 g of chlorotrimethylsilane in 1260 g of THF were placed in a three-neck flask and 1050 g of silicasol (Levasil 200/40%, BET=200 $m^2$/g, 40% $SiO_2$, Na+ removed by means of ion exchangers) were added dropwise from a dropping funnel while stirring vigorously.

Within one hour, two phases had formed and these were separated in a separating funnel. The lower phase contained more than 99% of the solid, while the upper phase contained the major part of the water. The lower phase was diluted with 140 g of THF and admixed with 63 g of chlorotrimethylsilane while stirring. After stirring for one hour, the mixture was transferred to a separating funnel.

Within one hour, two phases had again formed and these were drained separately. The upper phase consisted mainly of water and THF.

The lower phase was transferred to a three-neck flask and diluted with 400 g of toluene. Further toluene was then added and a mixture of THF, water and toluene was distilled off. The toluene was added in such a way that the solution did not become dry. Distillation was continued until the boiling point of toluene had approximately been reached.

The still acidic toluene sol obtained in this way was heated under reflux and the runback was passed through a column filled with sodium carbonate. After refluxing for 6 hours, the sol no longer had an acidic reaction.

EXAMPLE 3

751.5 g of DINP (diisononyl phthalate) are placed in a flask and 1315 g of a dispersion of $SiO_2$ nanoparticles in toluene from Example 2 (average particle size: 20 nm, solids content: 38.1% by weight) are added while stirring vigorously. The solvent is removed at 80° C. under reduced pressure. This gives a clear dispersion having a high stability. The viscosity was measured at 25° C. on a Brookfield viscometer RVDV-II+ using spindle 42 at 100 $min^{-1}$. It is 825 mPas. The dispersion is stable for 9 months at 50° C. and displays a viscosity increase of only 3% after this time.

EXAMPLE 4

In a flask, 498.3 g of DINP are diluted with 200 g of isopropanol. 957.3 g of a dispersion of $SiO_2$ nanoparticles in isopropanol from Example 1 (average particle size: 25 nm, solids content: 34.7%) are added while stirring vigorously. The solvent is removed at 50° C. under reduced pressure. This gives a turbid paste having a viscosity of 1.8 Pas.

EXAMPLE 5

60 g of benzyl 2-ethylhexyl adipate (Adimoll BO, Lanxess) are diluted with 30 g of toluene. 105.0 g of an $SiO_2$ dispersion from Example 2 are added while stirring. The solvent is removed at 60° C. under reduced pressure. This gives a milky paste.

EXAMPLE 6

40 g of bis(2-propylheptyl)phthalate are diluted with 30 g of toluene. 109.7 g of an $SiO_2$ dispersion from Example 2 are added while stirring. The solvent is removed at 60° C. under reduced pressure. This gives a fluid dispersion.

EXAMPLE 7

1574.8 g of a dispersion of $SiO_2$ nanoparticles in toluene from Example 2 are diluted with 250 g of toluene. 600 g of bis(2-propylheptyl)phthalate (Palatinol 10-P, BASF) are added while stirring. The solvent is removed at 80° C. under reduced pressure. This gives a clear liquid having a viscosity of 1 Pas.

COMPARATIVE EXAMPLE 1

A pyrogenic silica (Aerosil R812s, Degussa) is suspended in Palatinol 10-P and mixed until a homogeneous dispersion has been formed. A dispersion having a solids content of 20% by weight is produced first. This is gradually diluted further by addition of further Palatinol 10-P. The viscosity of mixtures having different solids contents is determined.

TABLE 1

| Solids content [% by weight] | Viscosity [Pas] |
|---|---|
| 20 | 168 |
| 17.5 | 8.4 |
| 15 | 2.5 |
| 10 | 0.5 |

It can be seen from the table that the mixture having an Aerosil content of 17.5% by weight has a viscosity of 8.4 Pas. This is more than 8 times that of the mixture according to the invention as per Example 6 having a solids content of 50% by weight.

EXAMPLE 8

Production of Sealants

Three different formulations for sealants based on polyether polyurethanes are shown in Table 2 below. Formulation 1 is a comparative example which is not according to the invention and contains Palatinol 10-P as plasticizer. In the formulation 2 according to the invention, this plasticizer is replaced by a composition according to the invention as per Example 7. In formulation 3, which again serves as comparative example, the plasticizer is replaced by an Aerosil-containing composition as per Comparative Example 1.

TABLE 2

| Formulation 1 | | Formulation 2 | | Formulation 3 | |
|---|---|---|---|---|---|
| Component | Mass [g] | Component | Mass [g] | Component | Mass [g] |
| ST 61 | 37.45 | ST 61 | 37.45 | ST 61 | 37.45 |
| Palatinol 10-P | 13.30 | Mixture from Example 6 | 13.30 | Mixture from Comparative Example 1 | 13.30 |
| Disperplast | 1.00 | Disperplast | 1.00 | Disperplast | 1.00 |
| $TiO_2$ | 2.00 | $TiO_2$ | 2.00 | $TiO_2$ | 2.00 |
| Imerseal 50 | 20.00 | Imerseal 50 | 20.00 | Imerseal 50 | 20.00 |
| Socal U1S2 | 20.00 | Socal U1S2 | 20.00 | Socal U1S2 | 20.00 |
| Aerosil R202 | 2.00 | Aerosil R202 | 2.00 | Aerosil R202 | 2.00 |
| VTMO | 2.00 | VTMO | 2.00 | VTMO | 2.00 |
| Adhesion promoter ST | 1.50 | Adhesion promoter ST | 1.50 | Adhesion promoter ST | 1.50 |
| TK 14 50% strength in Shellsol | 0.20 | TK 14 50% strength in Shellsol | 0.20 | TK 14 50% strength in Shellsol | 0.20 |
| Solids content | 0% | | 6.7% | | 2.3% |

The production of the formulations was carried out as follows:

The polyether polyurethane ST-61 (silane-terminated polyether polyurethane, molecular weight about 9000 $gmol^{-1}$, hanse chemie), Palatinol 10-P (phthalic ester of isomeric $C_{10}$-alcohols, BASF) or mixture from Example 6 or Comparative Example 1 are firstly placed in a mixing cup and mixed in a Hauschild Speed Mixer DAC 150 FV until the components are homogeneously dispersed. $TiO_2$ (Tronox, Kerr-McGea Pigments GmbH & Co. KG), Imerseal 50 ($CaCO_3$, Imerys), Socal U132 (precipitated $CaCO_3$, Socal) and Aerosil R202 (Degussa) are then added and mixed in. VTMO (vinyltrimethoxysilane), the adhesion promoter ST (silane mixture, hanse chemie AG) and TK 14 (zinc catalyst, 50% strength in Shellsol, hanse chemie AG) are mixed in, in each case individually. The paste-like product is then degassed and spread by means of a doctor blade to give a plate.

The plates are stored at room temperature for 7 weeks in order to cure fully. Test specimens analogous to DIN 53504/ISO 37 (die S2) are stamped from the plates and elongation at break, tensile strength and E modulus (100% elongation) are determined on a tensile testing machine from Zwick. The Shore hardness was measured in accordance with DIN 53505. The tear propagation resistance is determined in accordance with ASTM D624-0 (die C) on the tensile testing machine.

The results are summarized in Table 3:

TABLE 3

| Formulation | 1 | 2 | 3 |
|---|---|---|---|
| Tear propagation resistance | 9.7 | 14.9 | 12.7 |
| Tensile strength | 2.54 | 3.44 | 3.35 |
| Elongation at break | 173 | 163 | 177 |
| E modulus (100%) | 1.00 | 1.04 | 1.13 |
| Shore A | 58 | 71 | 64 |

Formulation 2 according to the invention has, compared to formulation 1, a tear propagation resistance which is improved by more than half and a tensile strength improved by 35%. The Shore A hardness is increased by 13 units. Only the elongation at break is slightly reduced.

Compared to formulation 3, the example according to the invention displays advantages in respect of, in particular, the tear propagation resistance and the Shore A hardness.

The invention claimed is:

1. A method of dispersing silicon dioxide particles in a polymeric material, comprising:
   a) providing a plasticizer composition comprising a dispersion of silicon dioxide particles and one or more plasticizers, wherein:
      i) said silicon dioxide particles have an average particle size of 150 nm or less;
      ii) the proportion of silicon dioxide particles is from 10 to 80% by weight of said plasticizer composition;
      iii) the proportion of said one or more plasticizers is from 90 to 20% by weight of said plasticizer composition; and
      iv) the sum of the proportions of silicon dioxide particles and of said one or more plasticizers is at least 80% by weight of said plasticizer composition;
   b) mixing said plasticizer composition with a polymerizable material to produce a polymeric material comprising dispersed silicon dioxide particles.

2. The method of claim 1, wherein the sum of the proportions of silicon dioxide particles and the plasticizers in said plasticizer composition is at least 85% by weight.

3. The method of claim 1, wherein the sum of the proportions of silicon dioxide particles and the plasticizers in said plasticizer composition is at least 90% by weight.

4. The method of claim 1, wherein the sum of the proportions of silicon dioxide particles and the plasticizers in said plasticizer composition is at least 95% by weight.

5. The method of claim 1, wherein the sum of the proportions of silicon dioxide particles and the plasticizers in said plasticizer composition is at least 97% by weight.

6. The method of claim 1, wherein the sum of the proportions of silicon dioxide particles and the plasticizers in said plasticizer composition is at least 98% by weight.

7. The method of claim 1, wherein the sum of the proportions of silicon dioxide particles and the plasticizers in said plasticizer composition is at least 99% by weight.

8. The method of claim 1, wherein said plasticizer composition consists exclusively of plasticizers and silicon dioxide particles.

9. The method of claim 1, wherein said plasticizer composition is solvent-free.

10. The method of claim 1, wherein the proportion of silicon dioxide particles in said plasticizer composition is from 20 to 70% by weight.

11. The method of claim 1, wherein the proportion of silicon dioxide particles in said plasticizer composition is from 30 to 60% by weight.

12. The method of claim 1, wherein the proportion of silicon dioxide particles in said plasticizer composition is from 40 to 60% by weight.

13. The method of claim 1, wherein the proportion of plasticizers in said plasticizer composition is from 30 to 80% by weight.

14. The method of claim 1, wherein the plasticizers in said plasticizer composition is from 40 to 70% by weight.

15. The method of claim 1, wherein the proportion of plasticizers in said plasticizer composition is from 40 to 60% by weight.

16. The method of claim 1, wherein said silicon dioxide particles have an average particle size of from 4 to 80 nm.

17. The method of claim 1, wherein said silicon dioxide particles have an average particle size of from 8 to 40 nm.

18. The method of claim 1, wherein said silicon dioxide particles have an average particle size of from 10 to 30 nm.

19. The method of claim 1, wherein said silicon dioxide particles have an average particle size of from 10 to 25 nm.

20. The method of claim 1, wherein said silicon dioxide particles are colloidally dispersed in said plasticizer composition.

21. The method of claim 1, wherein said at least one plasticizer is selected from the group consisting of phthalates, adipates, trimellitic esters, phosphate esters, sebacates, azelates and sulphonates.

22. The method of claim 1, wherein said silicon dioxide particles have a surface modification to make them compatible with the plasticizer.

23. The method of claim 1, wherein said surface modification is selected from the group consisting of silanization, alcoholysis and physically adhering polymers.

24. The method of claim 1, wherein said polymeric material is a thermoplastic material or a PVC material.

25. The method of claim 1, wherein said polymeric material is an elastomer or a rubber.

26. The method of claim 25, wherein said polymeric material is a natural rubber or silicone rubber.

27. The method of claim 1, wherein the proportion of silicon dioxide particles in said polymeric material is from 1 to 50% by weight.

28. The method of claim 1, wherein the proportion of silicon dioxide particles in said polymeric material is from 1 to 30% by weight.

29. The method of claim 1, wherein the proportion of silicon dioxide particles in said polymeric material is from 1 to 20% by weight.

30. The method of claim 1, wherein the proportion of silicon dioxide particles in said polymeric material is from 1 to 10% by weight.

31. The method of claim 1, wherein the proportion of silicon dioxide particles in said polymeric material is from 2 to 6% by weight.

* * * * *